Figure 1:
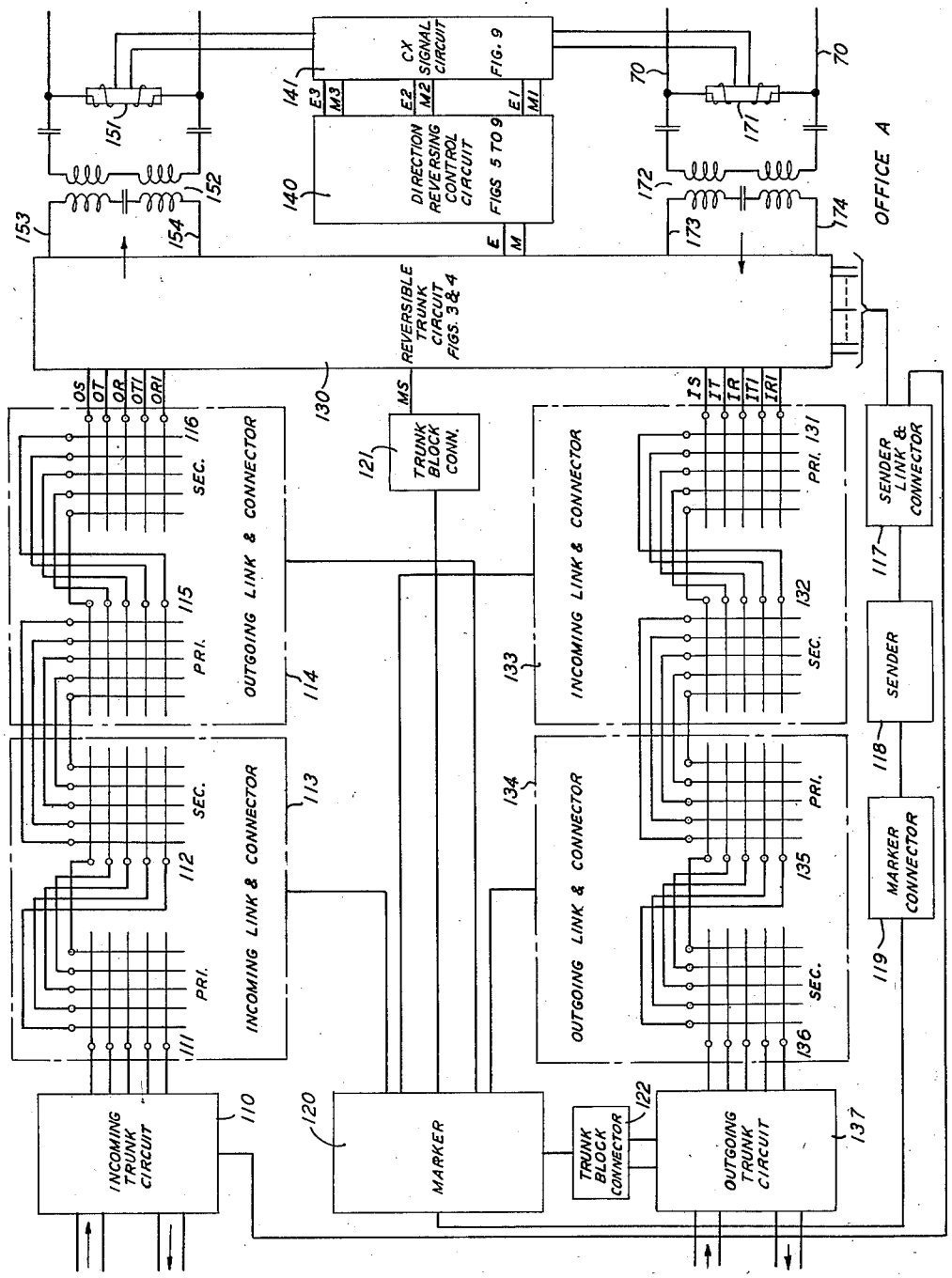

Nov. 6, 1956

C. O. PARKS 2,769,864

TIME AND TRAFFIC CONTROLLED TRUNKING SYSTEM

Filed Jan. 8, 1954

14 Sheets-Sheet 1

INVENTOR
C. O. PARKS
BY
R. O. Covell
ATTORNEY

Nov. 6, 1956

C. O. PARKS 2,769,864

TIME AND TRAFFIC CONTROLLED TRUNKING SYSTEM

Filed Jan. 8, 1954

14 Sheets-Sheet 4

INVENTOR
C. O. PARKS
BY
R. O. Covell
ATTORNEY

Nov. 6, 1956 — C. O. PARKS — 2,769,864
TIME AND TRAFFIC CONTROLLED TRUNKING SYSTEM
Filed Jan. 8, 1954 — 14 Sheets-Sheet 5

INVENTOR
C.O. PARKS
BY
R. O. Covell
ATTORNEY

Nov. 6, 1956            C. O. PARKS          2,769,864

TIME AND TRAFFIC CONTROLLED TRUNKING SYSTEM

Filed Jan. 8, 1954                             14 Sheets-Sheet 11

INVENTOR
C. O. PARKS
BY
R. O. Covell
ATTORNEY

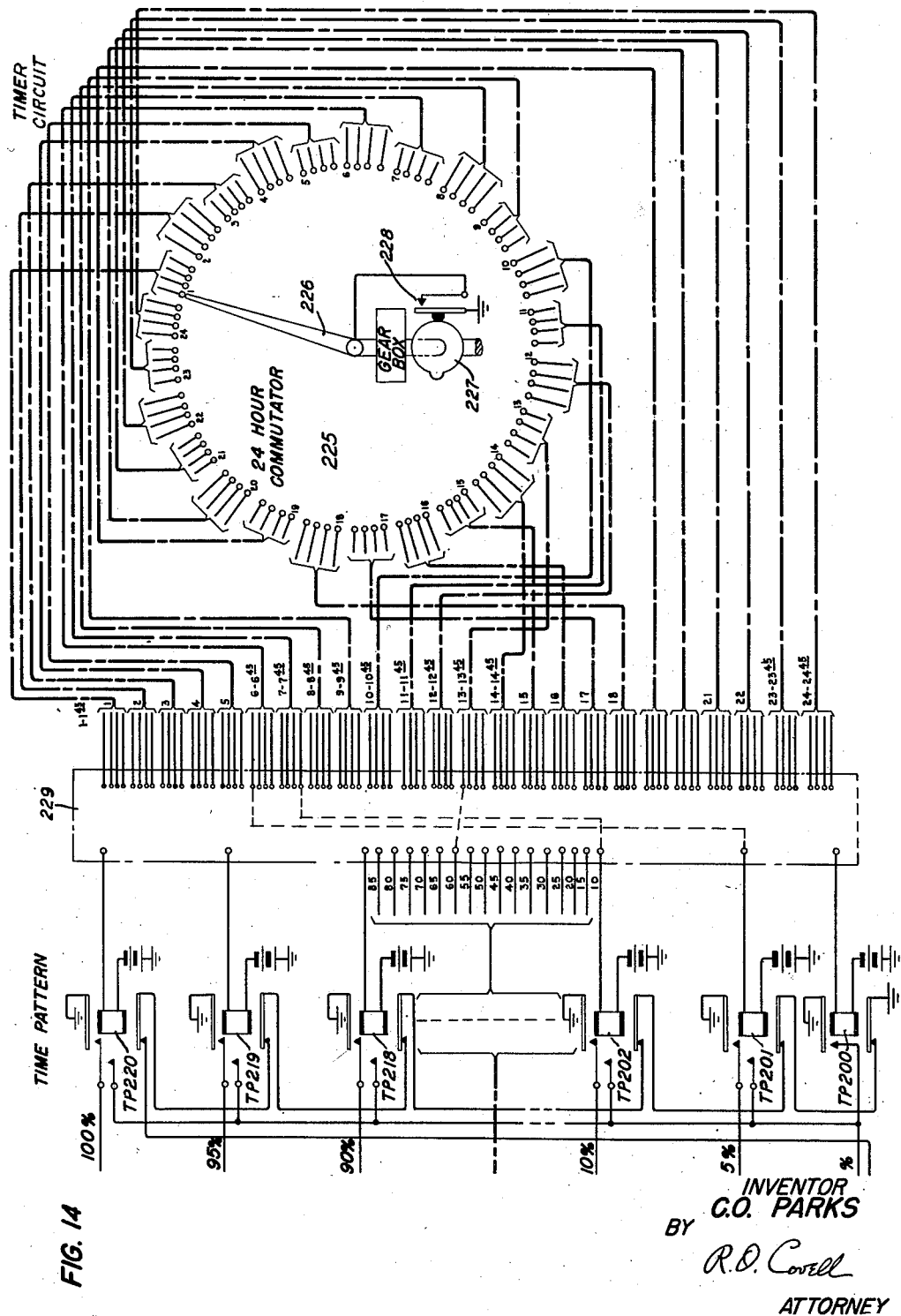

United States Patent Office 2,769,864
Patented Nov. 6, 1956

2,769,864

TIME AND TRAFFIC CONTROLLED TRUNKING SYSTEM

Charles O. Parks, East Norwalk, Conn., assignor to Bell Telephone Laboratories, Incorporated, New York, N. Y., a corporation of New York Application January 8, 1954, Serial No. 402,963

9 Claims. (Cl. 179—18)

This invention relates to communication systems and particularly to trunking arrangements and supervisory signaling over trunks between telephone offices.

Objects of the invention are more flexible trunking arrangements to automatically care for variations in traffic over interoffice trunks between telephone offices and a more efficient use of such trunks for supervisory signaling in connection with these trunks.

A feature of the invention is a telephone system comprising a group of two-way interoffice trunks arranged for one-way operation in either direction, the number of trunks available for use in each direction being automatically varied according to the time of day so as to provide for average time variations in traffic between two offices.

Another feature is a telephone system according to the preceding paragraph in which trunks are automatically changed from one direction of operation to the other independent of the time of day control whenever there are more calls in a given direction than there are trunks then arranged for operation in that direction.

A further feature of the invention is a telephone system in which the signaling channel of one of the trunks in a group of two-way interoffice trunks, each of which is arranged for operation as a one-way trunk in either direction, is used for controlling the automatic transfer of trunks from one direction to the other depending on relative traffic in the two directions.

These and other features of the invention as embodied in an automatic telephone system are shown schematically in the drawings and described in this specification. The invention is, however, not limited to the specific system and arrangements shown in the drawings but may be applied generally to all telephone systems comprising interoffice trunks.

Figure 2:
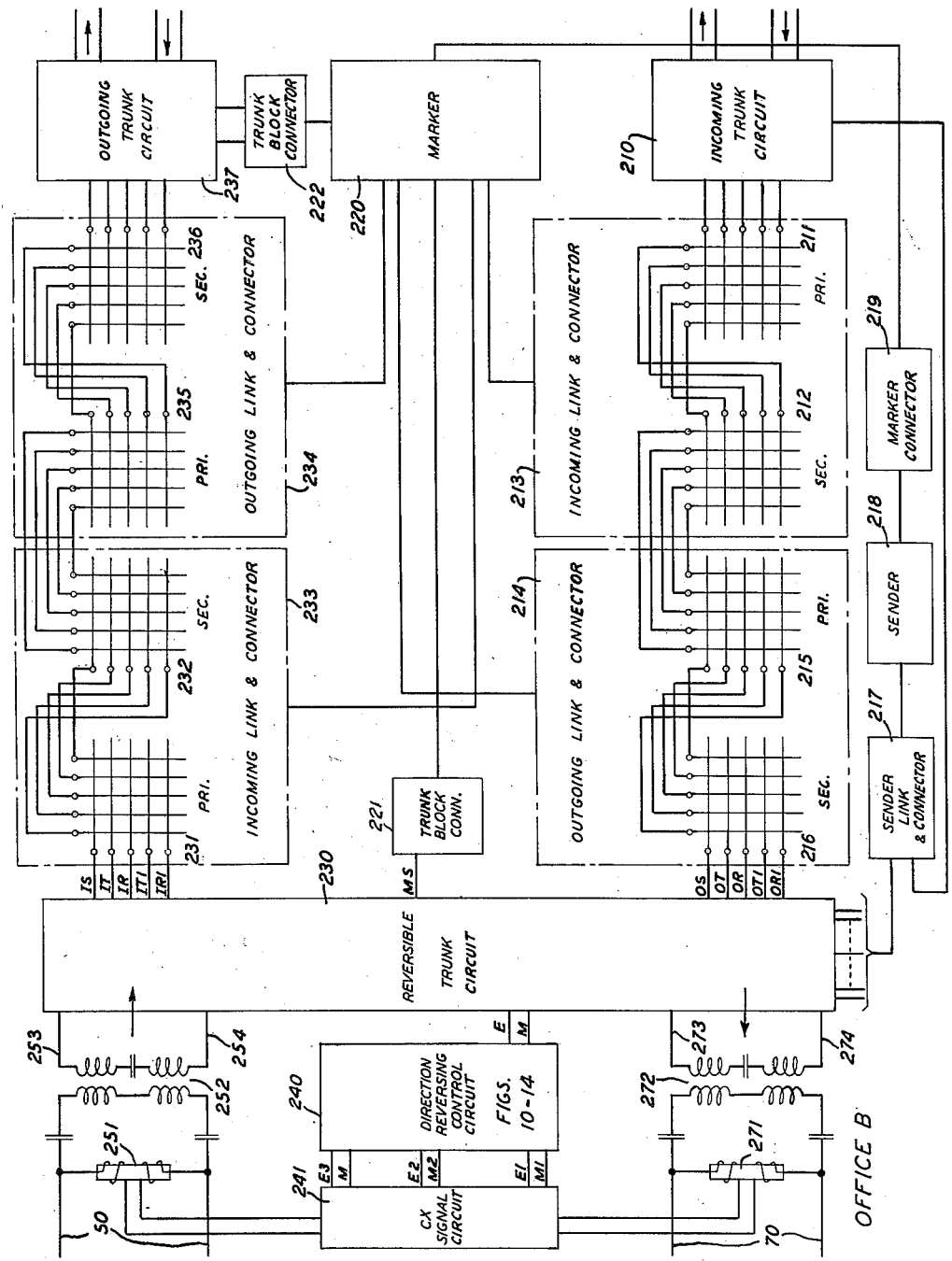
Figure 3:
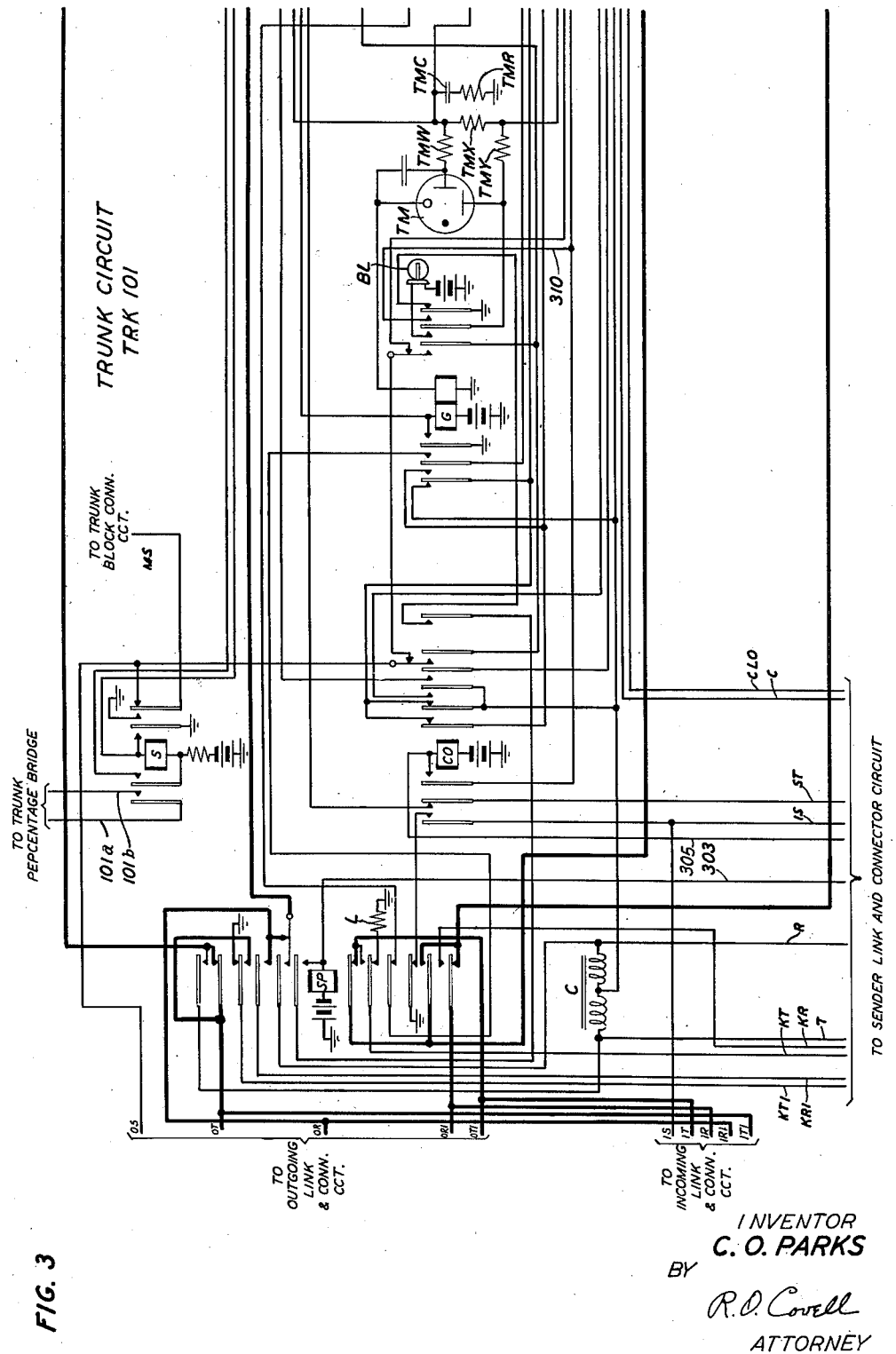
Figure 4:
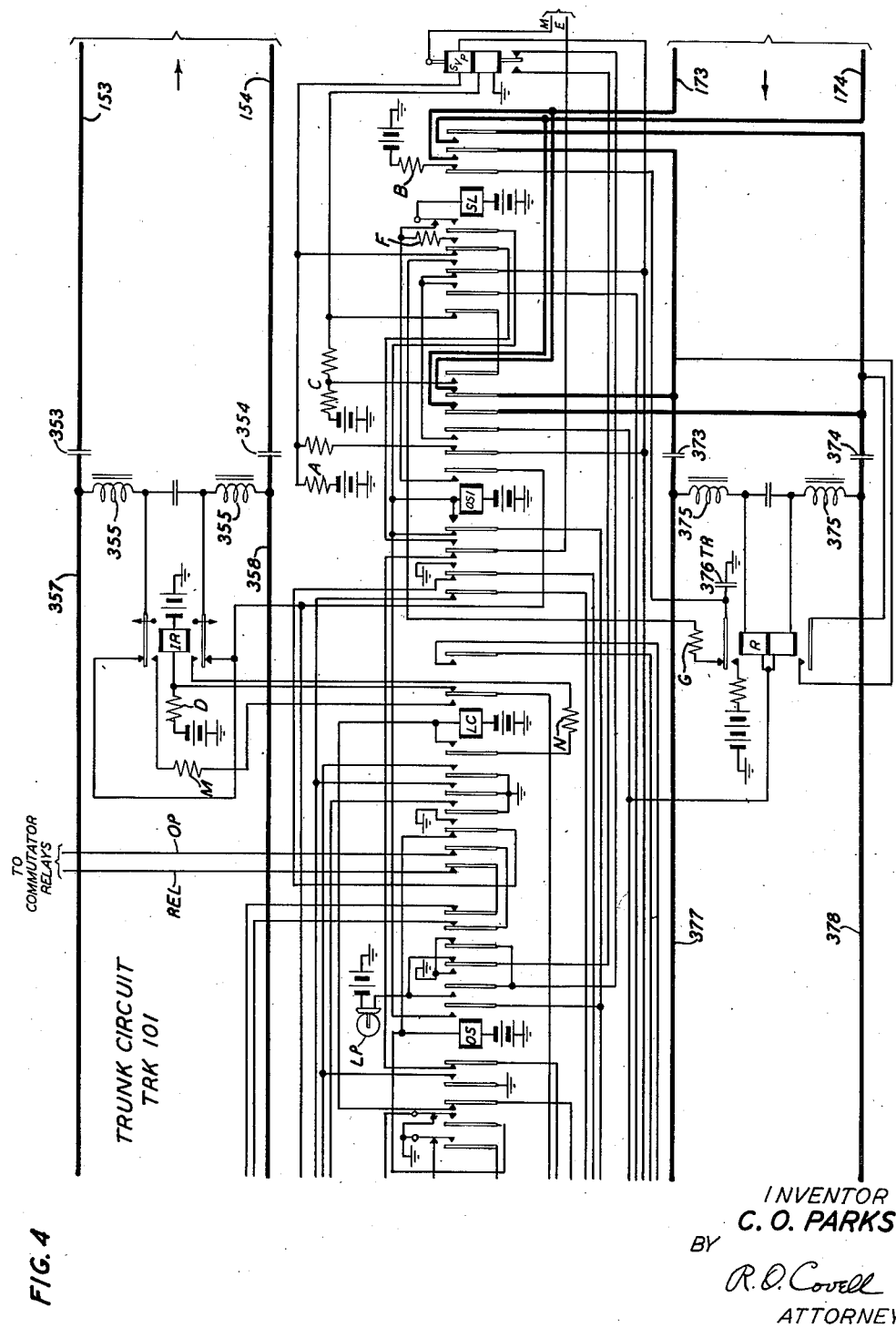

Referring to the drawing:

Figs. 1 and 2 show two toll switching offices A and B, each comprising crossbar switching equipment and control apparatus for selecting interoffice trunks between these two offices, two reversible trunk circuits, one in each office, these trunk circuits being interconnected by a composite signaling channel and by two voice transmitting channels, one in each direction, and trunk direction reversing and supervisory control circuits, one in each office, the two control circuits being operatively interconnected by composite signaling channels;

Figs. 3 and 4 show one of the reversible trunk circuits in detail;

Figs. 5 to 9, inclusive, show a group of reversible trunk circuits and the reversing and supervisory control circuit equipment in office A;

Figs. 10 to 14, inclusive, show a group of reversible trunk circuits and the reversing and supervisory control circuit in office B; and Fig. 15 shows the arrangement of Figs. 5 to 14 to form an operative interoffice trunking arrangement.

The two toll offices A and B shown in Figs. 1 and 2 include switches of the crossbar type together with control means including senders and markers and connectors for operatively connecting the control means to the switches. Each office includes incoming trunk circuits such as 110 and 210 connected to trunks from other toll and local offices, outgoing trunks such as 137 and 237 connected to trunks outgoing to other toll and local offices, reversible trunk circuits such as 130 and 230 arranged for use at times as incoming trunk circuits and at other times as outgoing trunk circuits, and direction reversing and supervisory control circuits 140 and 240 which control the direction in which the trunk circuits 130 and 230, respectively, are employed at any particular time. Each of the trunk circuits 110, 130, 137, 210, 230 and 237 is a four-wire trunk circuit, providing a two-wire talking channel in each direction. Crossbar switches such as 111, 112, 115 and 116 in office A and 211, 212, 215 and 216 in office B are provided for extending connections between incoming trunk circuits and outgoing trunk circuits. The offices A and B include sender circuits 118 and 218 for use in registering and transmitting office code and subscriber directory numbers and marker circuits 120 and 220 for controlling operation of the switches. Office A also includes connector units 113, 114, 117, 119, 121, 122, 133 and 134 and office B includes connector units 213, 214, 217, 219, 221, 222, 233 and 234 for operatively connecting the senders and markers with the trunk circuits and switches, as required. The incoming and outgoing trunk circuits 110, 210, 137 and 237, the crossbar switches, the sender and marker circuits, and the connector units are shown only in outline form, a complete description of such switches and circuit units being found in Patent 2,236,246 granted March 25, 1941, to G. V. King, J. B. McKim and O. Myers and Patent 2,382,893 granted August 14, 1945, to B. McKim and O. Myers. The reversible trunk circuits 130 and 230 are each similar to the trunk circuit TRK101 shown in detail in Figs. 3 and 4. As shown, these trunk circuits and the associated sender circuits are arranged for multifrequency signaling with respect to the transmission of routing and directory number digits. For the purpose of this description it is assumed that there are twenty trunks associated with reversible trunk circuits 130 in office A and with reversible trunk circuits 230 in office B. This is not to be construed as a limitation on the size of a trunk group to be handled by the invention as trunk group of any size may be so handled. The first and last three of these trunk circuits in office A, designated TRK101, TRK118, TRK119 and TRK120 are represented in Fig. 6 by the LC, OS and S relays of each; and like representations of the associated four trunk circuits in office B are found in Fig. 13.

The conductors of trunk 50 and repeating coils 152 and 252 provide one talking channel, the conductors of trunk 70, the repeating coils 172 and 272 provide a second talking channel, and the repeating coils 162 and 262 in combination with the conductors of both trunks 50 and 70 provide a third talking channel between offices A and B. These talking channels are associated with reversible trunk circuits 130 and 230, and other trunks, not shown, are provided so that each trunk circuit 130 in office A is connected by two talking channels, one in each direction, with each trunk circuit 230 in office B. As shown in Figs. 6 and 9 and Figs. 10 and 13, the channel including repeating coils 152 and 252 and the channel including repeating coils 172 and 272 are associated with trunk circuit TRK101 in office A and with trunk circuit TRK201 in office B. The channel including repeating coils 162 and 262 is associated with another of the trunk circuits in each office.

Figure 8:
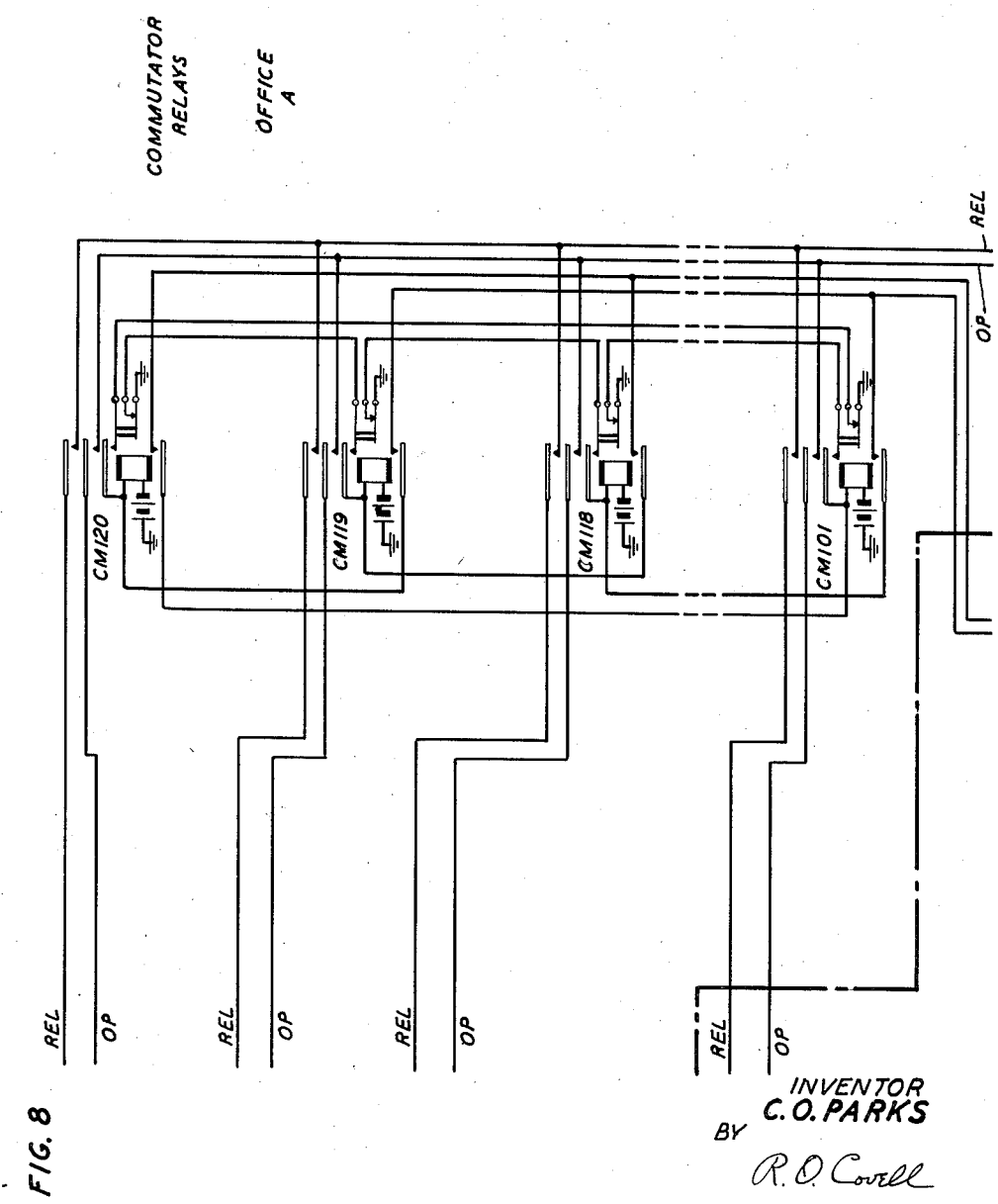
Figure 11:
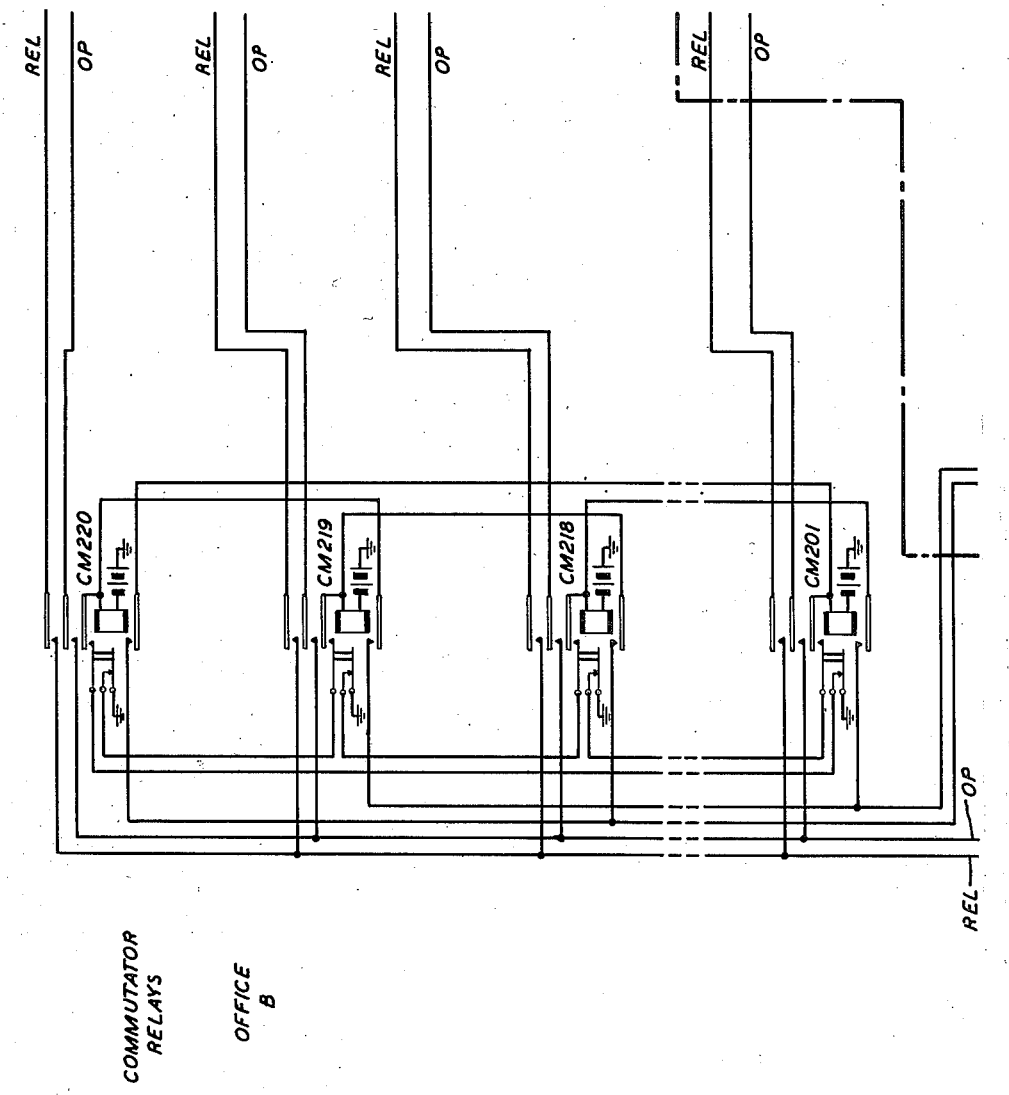
Figure 12:
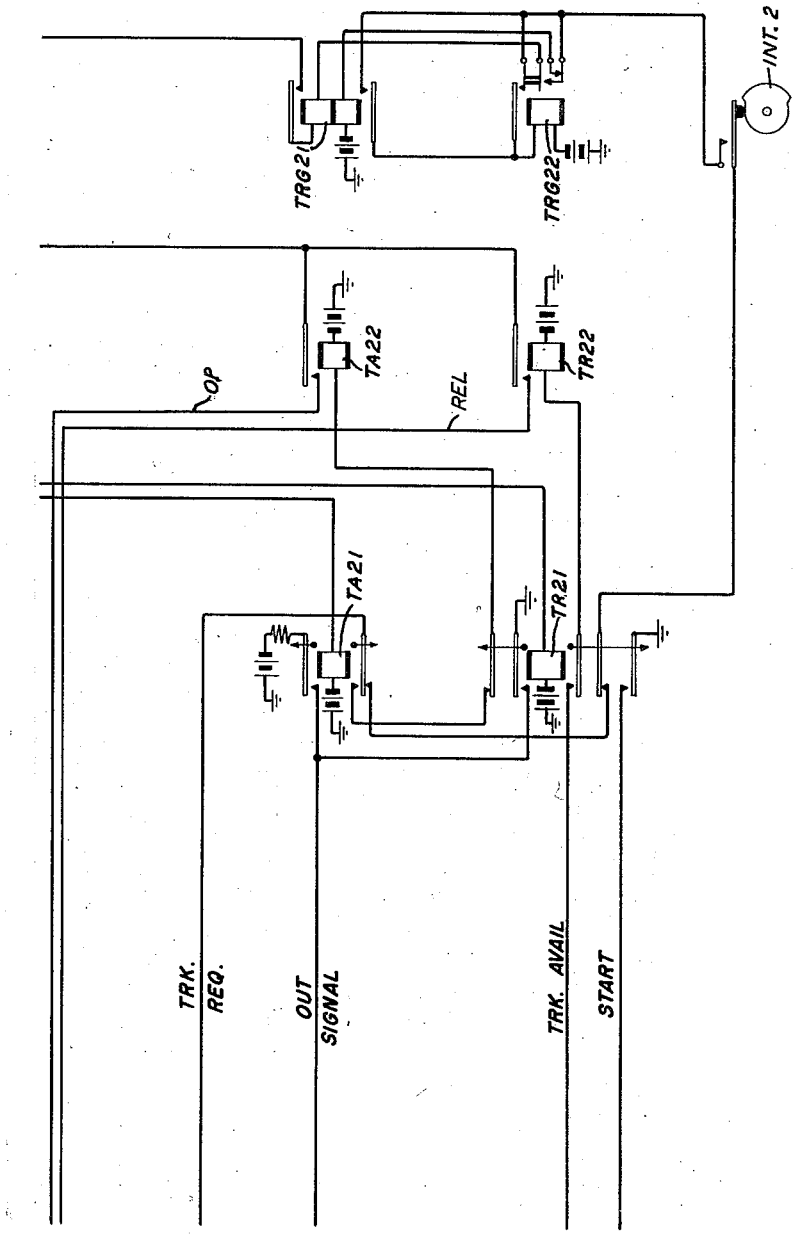
Figure 13:
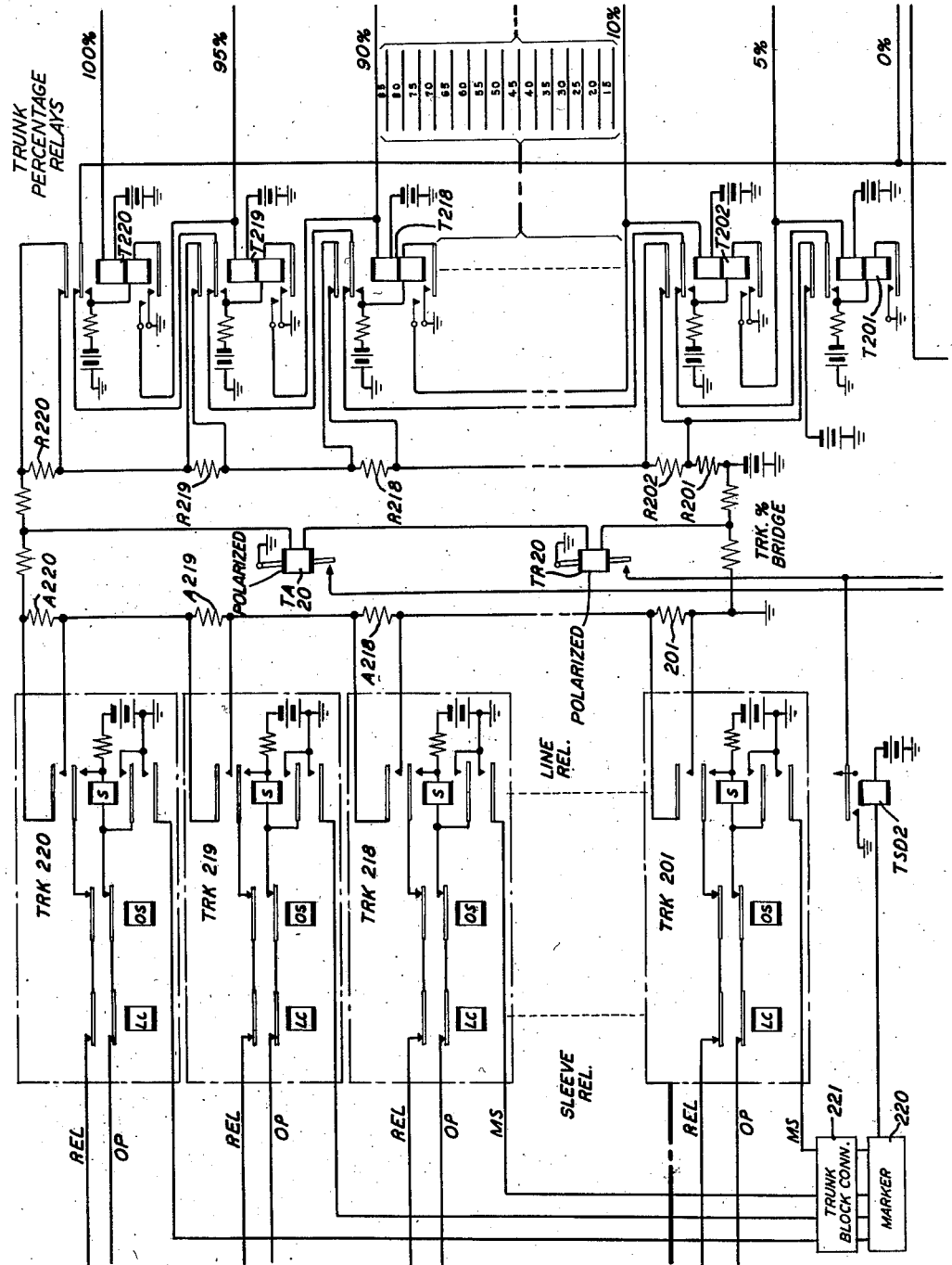

As shown in Figs. 1 and 2, the two-wire trunks 50 and 70 in combination with composite signaling circuits 141 and 241 provide three two-way composite signaling channels between offices A and B. These signaling channels and associated signal relays are shown in detail in the right hand portion of Fig. 9 and left hand portion of Fig. 10. One of these signaling channels comprises the upper conductor of trunk 70 and relays CX13 and CX23 and is used for transmitting supervisory signals between trunk circuit TRK101 in office A and trunk circuit TRK201 in office B. A second one of these signaling channels comprises the lower conductor of trunk 50 and relays CX12 and CX22 and is used for transmitting trunks-required signals between control circuit 140 of office A and control circuit 240 of office B. The third signaling channel comprises the upper conductor of trunk 50 and relays CX11 and CX21 and is used for transmitting control signals for synchronizing the operating of commutator relays CM101 to CM120 of office A with the operation of commutator relays CM201 to CM220 of office B, as hereinafter described. The commutator relays, which are shown in Figs. 8 and 11, are controlled by synchronizing circuits, shown in Figs. 9 and 10 and comprising relays X1, Y1, CMC1, ST11, ST12 and SLO1 in office A and like relays in office B. The lower conductor of trunk 70 is used for neutralizing any difference in ground potential between offices A and B. Additional signaling channels, not shown, are provided for supervisory signaling between the other trunk circuits 130 and 230 in the same group.

Figure 6:
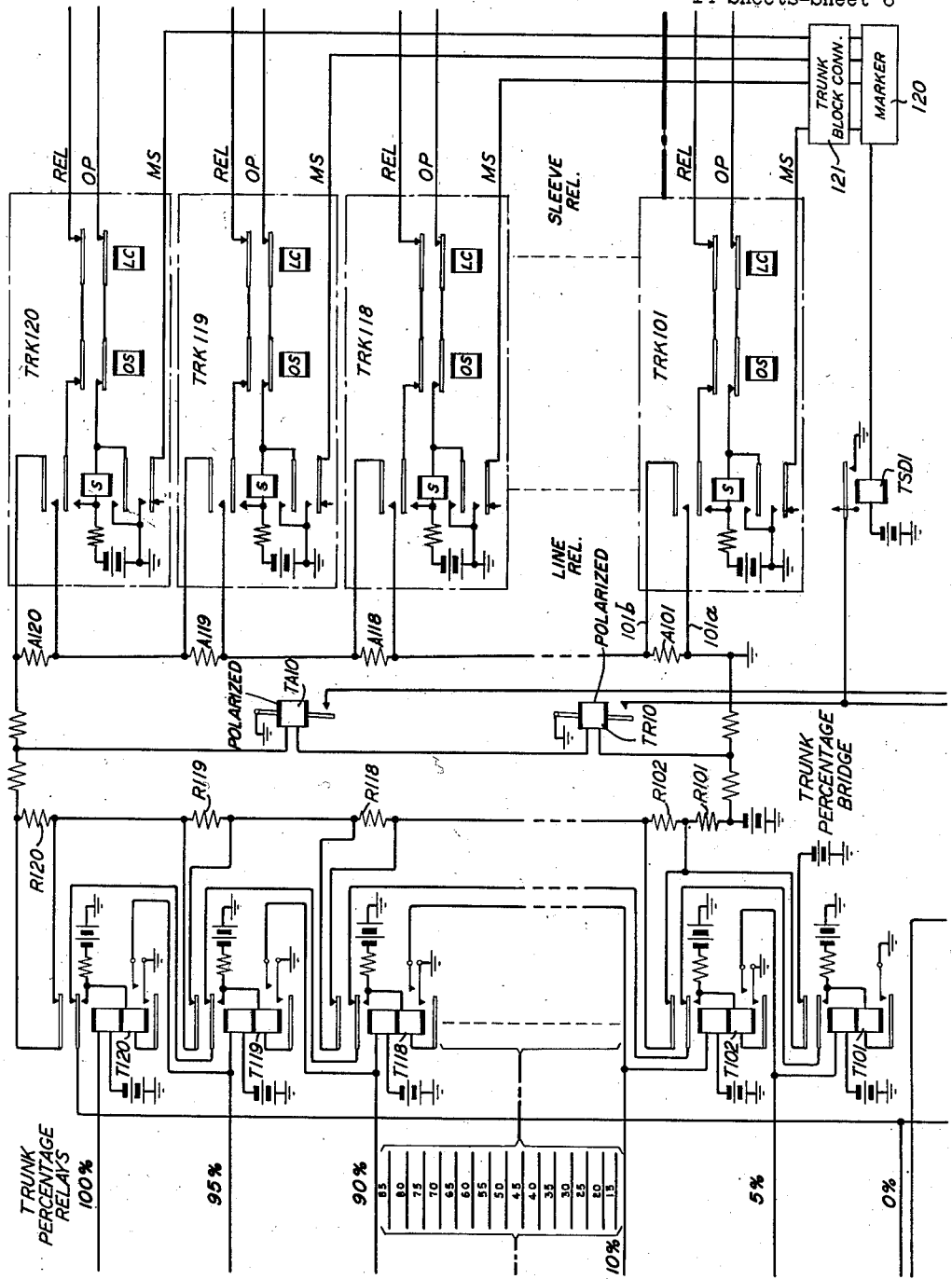
Figure 7:
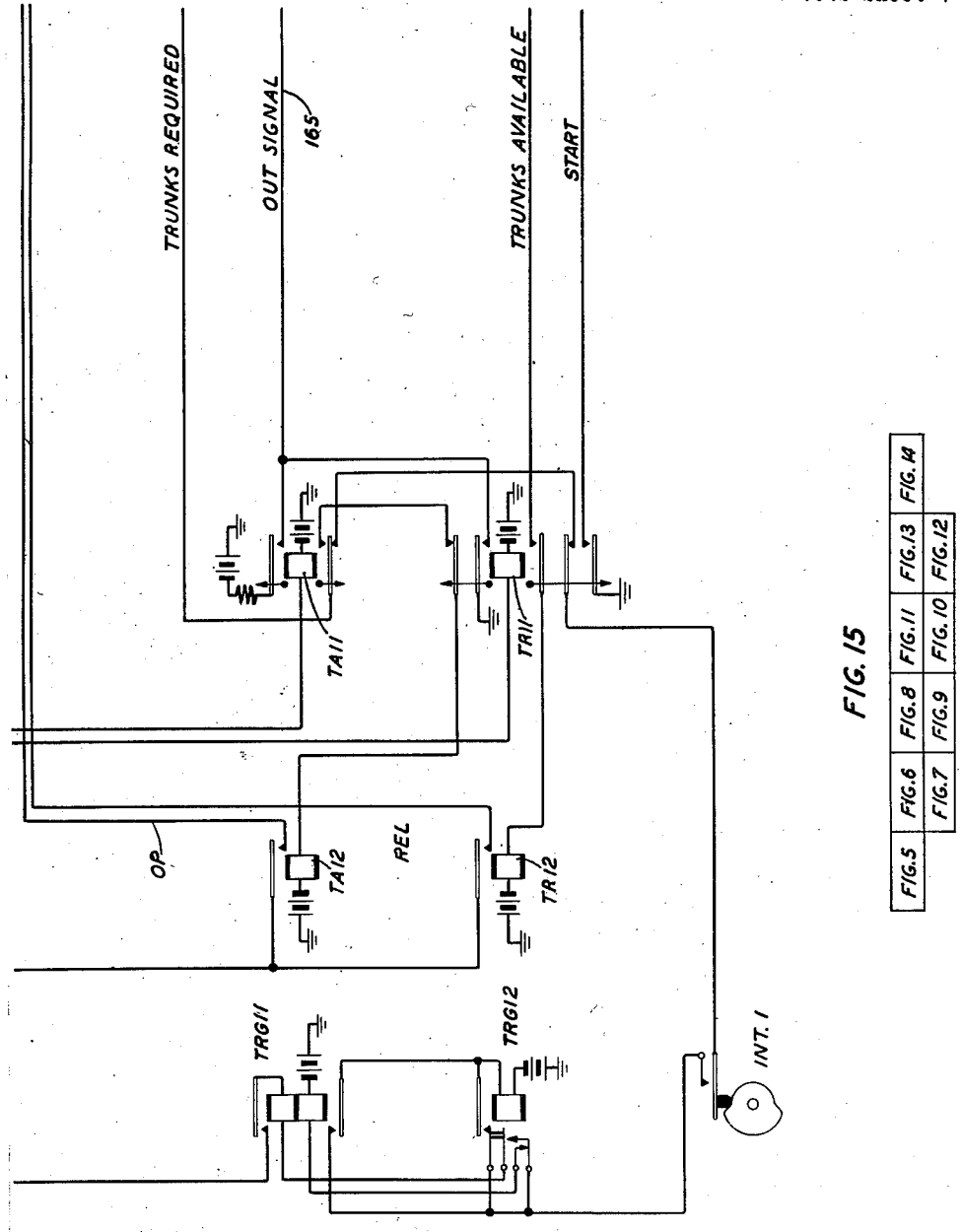

Referring now to the reversible trunk circuit 130, which is designated TRK101 and shown in detail in Figs. 3 and 4 and shown in part in Fig. 6, this trunk circuit is a four-wire trunk circuit having one pair of talking conductors, identified as 173 and 174 at the right end of Fig. 4, connected (as shown in Fig. 1 and also in Fig. 9) to the talking channel of trunk 70 for transmitting voice currents incoming from the associated trunk circuit 230 in office B; another pair of talking conductors, identified as 153 and 154, connected (as shown in Fig. 1 and also in Fig. 9) to the talking channel of trunk 50 for transmitting voice currents outgoing to the associated trunk circuit 230 in office B; a signaling conductor M for effecting the transmission of supervisory signals over the composite signaling channel comprising the upper conductor of trunk 70 to the associated trunk circuit 230 in office B; and a signaling conductor E for receiving supervisory signals over said composite signaling channel from the associated trunk circuit 230 in office B. The conductors identified at the left end of Fig. 3 as OS, OT, OR, OT1 and OR1 connect to terminals of crossbar switches 116 as shown in Fig. 1 for use when trunk circuit TRK101 is in use as an outgoing trunk circuit on calls outgoing to office B; and the conductors identified at the left end of Fig. 3 as IS, IT, IR, IT1 and IR1 connect to terminals of crossbar switches 131 as shown in Fig. 1 for use when trunk circuit TRK101 is in use as an incoming trunk circuit on calls incoming from office B. The conductors identified at the lower edge of Fig. 3 as KT1, KR1, KT, KR, T, R, 303, 305, IS, ST, C and CLO are, as indicated, connected to a sender link and connector circuit 117 as shown in Fig. 1. The conductor MS at the top of Fig. 3 connects to a trunk block connector 121 as shown in Fig. 1, ground being connected to conductor MS when the trunk circuit is busy or unavailable for use as an outgoing trunk circuit. The conductors 101a and 101b, at the top of Fig. 3, connect the resistor A101 across normally open contacts of relay S, as shown in Fig. 6. The conductors REL and OP, at the top of Fig. 4, are connected to contacts of commutator relay CM101 as shown in Fig. 8.

Figure 9:
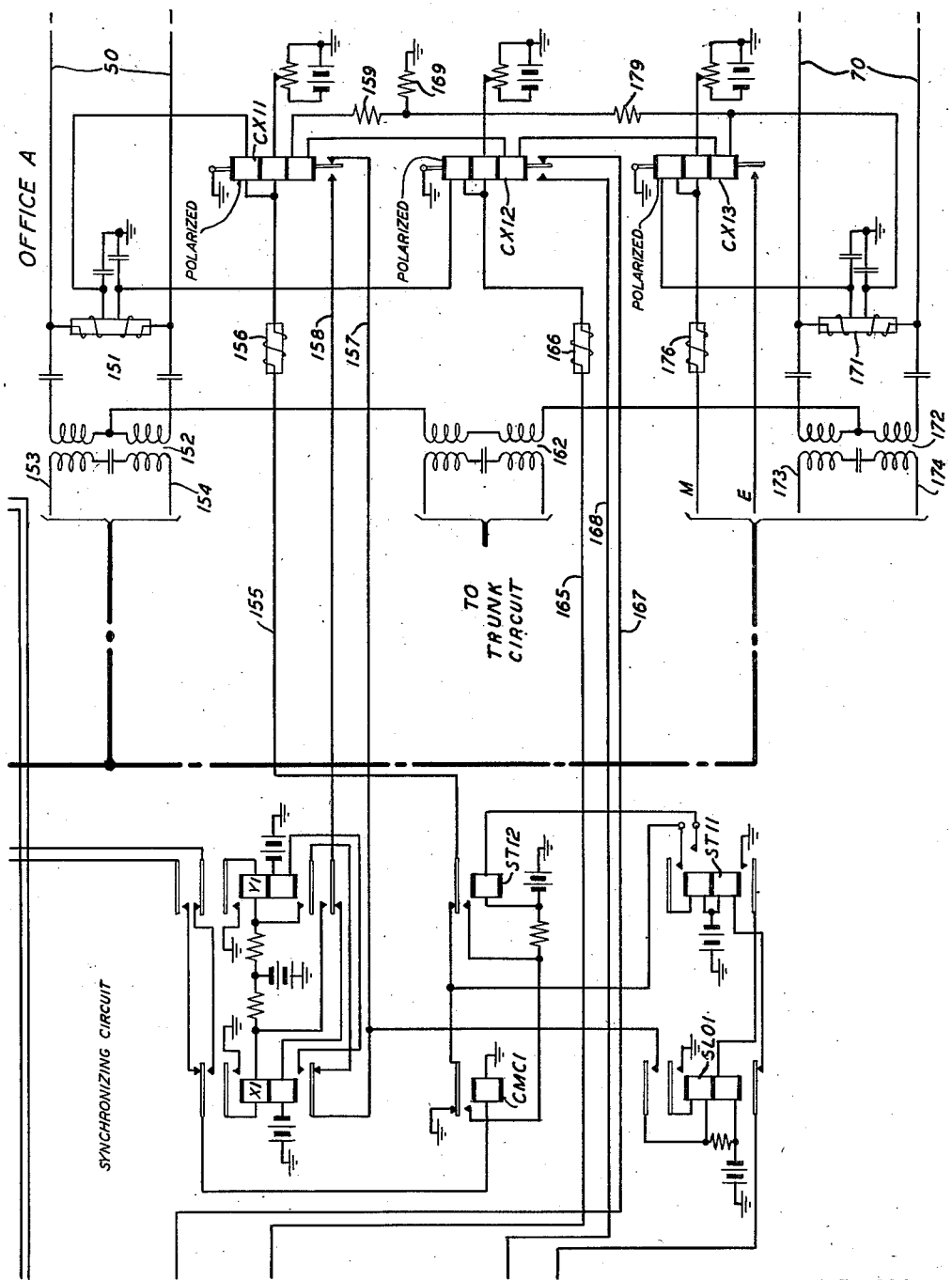
Figure 10:
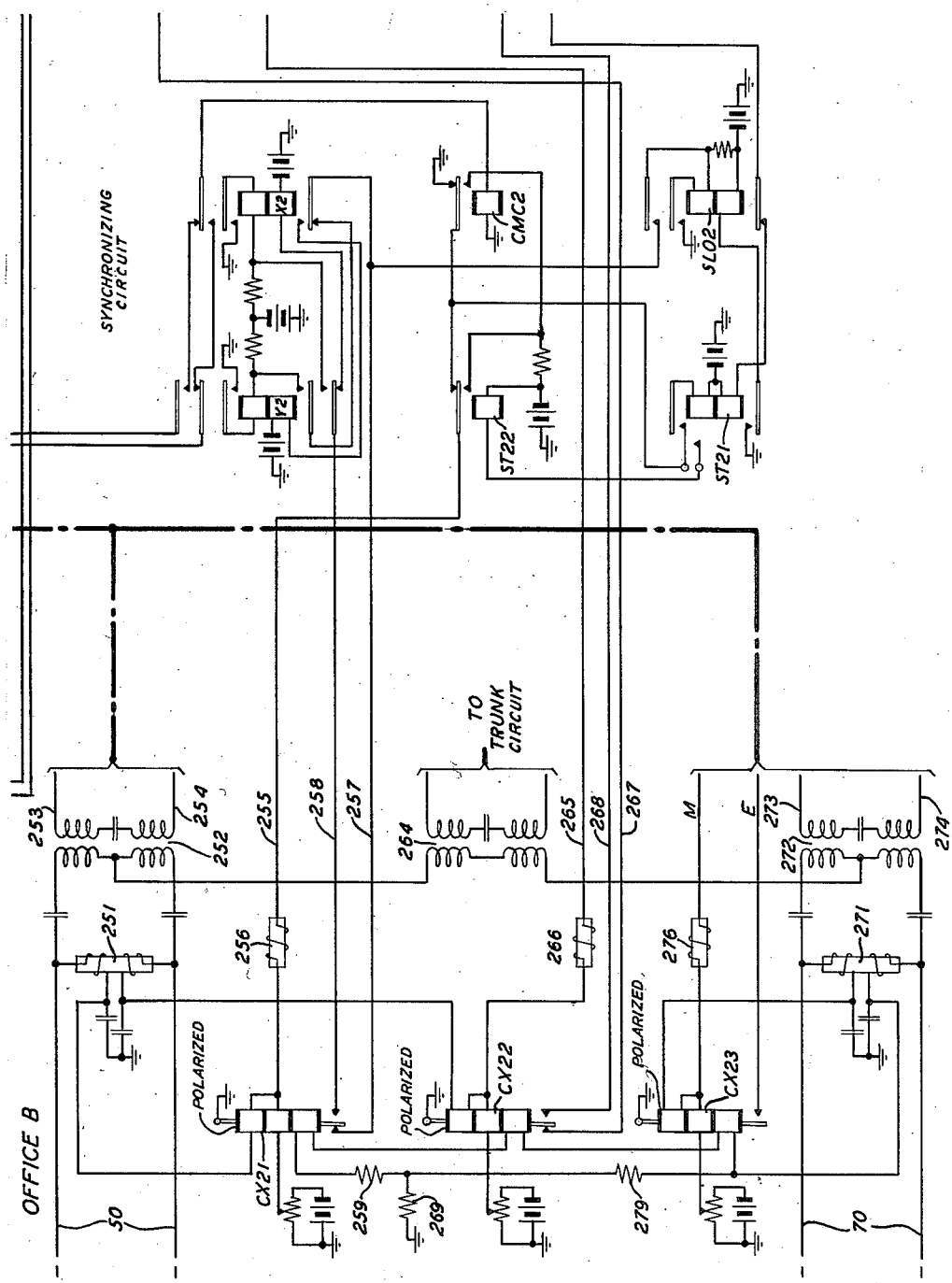

During periods when the trunk circuit TRK101 is available for use only as an incoming trunk circuit, relay S will have been operated, as hereinafter described. With relay S operated, the trunk percentage bridge resistor A101 is short-circuited and ground is connected to the MS conductor to simulate a busy condition thereby making this trunk circuit unavailable for use as an outgoing trunk circuit. Relay S is locked operated until such a time as the trunk circuit is to be made available for use on calls outgoing to office B, as hereinafter described. Assume now that the trunk circuit TRK201 in office B, with which the trunk circuit TRK101 in office A is interconnected, is seized on a call from office B to office A, the signal transmitted over the composite signaling channel comprising the upper conductor of trunk 70 operates relay CX13, shown in Fig. 9; and relay CX13 connects ground to signaling conductor E of trunk circuit TRK101, as shown in Fig. 9. The ground thus connected to conductor E is extended through a back contact of relay OS1, inner left back contact of relay OS, a back contact of relay CO, and another back contact of relay OS to the winding of relay LC, thus operatively energizing relay LC. The ground connected to conductor E is further extended from said inner left back contact of relay OS, through another back contact of relay CO in parallel with a back contact of relay G to the upper winding of relay SVP, thereby operatively energizing relay SVP. The operation of relay LC closes a circuit for operating relay G; short-circuits condenser TMC to prevent false firing of gas discharge tube TM; connects ground through the left back contact of relay CO to conductor ST leading to the sender link and connector circuit, thereby to effect the connection of a sender 118 for use with the trunk circuit TRK101; and connects ground to conductor OS, this connection being of no utility while relay S is operated. The operation of relay SVP, disconnects the outgoing signaling conductor M from ground at a back contact of relay OS and connects this conductor to battery at a different back contact of relay OS, thereby to effect the sending of a "stop" signal over the signaling channel to office B thereby to prevent the sending of office code and directory digit signals to trunk circuit TRK101 until a sender 118 has been attached thereto to receive from office B multifrequency tone signals representing the directory number of the called subscriber line. The aforementioned operation of relay G closes a locking circuit for itself, closes a circuit path for maintaining the energization of relay LC after the above traced operating circuit is opened by the operation of relay CO, and connects ground to conductor 310.

When a sender is attached to trunk circuit TRK101, ground is connected in the sender to conductor 305, operating relay CO. Relay CO locks to grounded conductor 310; connects ground to conductor IS leading to the attached sender; opens the operating circuit of relay LC; opens the connection between signaling conductor E and the upper winding of relay SVP, the energization of this winding being maintained under control of the associated sender by its connection in simplex through the windings of retardation coil C and conductors T and R leading to the associated sender; and disconnects ground from conductor ST leading to the sender. When the sender has completed class registration and a test for ground on conductor IS, the sender closes a circuit through conductor 303 for operating relay SP. Relay SP, operated, connects talking conductors 153 and 154 of the trunk to conductors T and R leading to the sender; connects conductors IT and IR from the incoming link and connector circuit to conductors KT and KR leading to the sender; connects conductors IT1 and IR1 from the incoming link and connector circuit to conductors KT1 and KR1 leading to the sender; and disconnects ground from conductor IS leading to the sender and to the incoming link and connector circuit. When the sender is ready to receive tone signals representing the directory number of the called line, it opens the simplex circuit over conductors T and R causing release of relay SVP. The release of relay SVP disconnects battery from, and connects ground to, outgoing signaling conductor M to cause transmission of a "start" signal to office B; whereupon the tone signals are transmitted from office B over the trunk 50, through conductor 153 and 154, condensers 353 and 354, front contacts of relay SP, and through conductors T and R to associated sender. When the sender has received the routing information, it obtains connection to a marker which controls the establishment of a connection from trunk circuit TRK101 through switches 131, 132, 135 and 136 as shown in Fig. 1 to an outgoing trunk circuit 137 which may be an intertoll trunk or a switching trunk, depending upon the location of the central office in which the called line is located. After the sender completes the transmission of routing information, if needed, and the called line number, and before the sender is released, it disconnects ground from conductor 303, releasing relay SP. The release of relay SP reconnects ground to conductor IS leading to the incoming link and connector circuit to maintain energization of the hold magnets, not shown, of the switches 131, 132, 135 and 136 to maintain the connection therethrough with the outgoing trunk circuit 137. The release of relay SP also completes the talking connection from conductors 153 and 154, through condensers 353 and 354, back contacts of relay SP, conductors IT1 and IR1 and the contacts of the crossbar switches to outgoing trunk circuit 137; and completes the talking connection from conductors 173 and 174, through back contacts of relay OS1, condensers 373 and 374, back contacts of relay SP, conductors IT and IR and the contacts of the crossbar switches to outgoing trunk circuit 137.

If the call is completed and the called subscriber answers, a circuit is closed from ground in the outgoing trunk circuit 137, through conductors of the crossbar switches and conductors IT and IR of the incoming link and connector circuit in parallel, back contacts of relay SP, windings of retard coil 375 and windings of relay R in parallel, thence through a front contact of relay CO and the upper winding of relay SVP to battery; whereby relay SVP is again energized to transmit an answer signal to office B by disconnecting ground from, and connecting battery to, signaling conductor M. Relay SVP is under control of the called subscriber and, when the receiver is replaced on the switchhook, relay SVP releases to effect the transmission of a disconnect signal to office B. When the connection is released from the calling end, the signaling relay CX13 is released whereby ground is disconnected from conductor E releasing relay LC. With relay LC released, relay IR is operated and renders effective a circuit for charging condenser TMC, this circuit being traced from battery through ballast lamp BL, a front contact of relay G, resistors TMY and TMX, condenser TMC and resistor TMR, to ground. When the charge on condenser TMC reaches a value where the difference in potential across the control gap of tube TM is sufficient to cause discharge thereacross, the tube is energized and the current in the circuit including the main gap and the right winding of relay G causes the release of relay G due to the opposing energization of its two windings. The release of relay G opens its locking circuit, causes the release of relay IR, causes the release of relay CO, causes the deenergization of tube TM, and disconnects the winding of relay LC from signaling conductor E. The release of relay CO reconnects the windings of relays LC and SVP to conductor E awaiting seizure on another incoming call.

During periods when the trunk circuit TRK101 is available for use as an outgoing trunk circuit, relay S will be non-operated so that there is no ground connected to conductor MS leading to the trunk block connector circuit except when this trunk circuit is busy on a call outgoing to office B. Assume now that an incoming trunk circuit 110 in Fig. 1 receives a call, the completion of which under the control of a connected sender 118 and marker 120 involves extension of the connection from trunk circuit 110 through switches 111, 112, 115 and 116 to an outgoing trunk circuit 130 which we will further assume is trunk circuit TRK101 shown in detail in Figs. 3 and 4. When the marker 120 tests trunk circuit TRK101 through trunk block connector 121 to determine its availability for use in extending the connection to office B, and this trunk circuit is then idle, ground is connected through a low resistance in the marker, through conductor MS, the right back contact of relay S, continuity back contacts of relays CO and G, a back contact of relay OS1 and a back contact of relay LC to the winding of relay OS, thereby operating relay OS. When switches 111, 112, 115 and 116 are operated under control of the marker to connect trunk circuit 110 to trunk circuit TRK101, ground is connected in trunk circuit 110 through contacts of the switches to conductor OS to maintain the operation of relay OS after the marker has completed its operations and been disconnected from these trunk circuits. The operation of relay OS disconnects incoming signaling conductor E from the windings of relays LC and SVP, connects ground to condenser TMC to prevent breakdown of tube TM, closes a circuit for operating relay G, and disconnects the winding of relay LC from the winding of relay SVP. The operation of relay OS also disconnects ground from, and connects battery to, outgoing signaling conductor M to effect transmission of a seizure signal to office B. The operation of relay G closes a locking circuit for itself and closes a locking circuit for relay OS which includes the continuity back contact of relay CO, thence over conductor OS and through the contacts of switches 116, 115, 112 and 111 to ground in the trunk circuit 110. The operation of relay G connects ground to conductor 310 thus causing the operation of relay OS1. Relay OS1 locks to conductor 310; opens the connection between talking conductors 377 and 378 and conductors 173 and 174; opens the short circuit across resistor TMX; and connects incoming signaling conductor E through a back contact of relay SL to battery.

When the seizure signal is received in office B by the incoming trunk circuit 230 therein associated with trunk circuit TRK101 of office A, an off-hook signal is transmitted therefrom as a "stop" signal which effects the operation of relay CX13, whereby ground is connected to conductor E to prevent the sender 118 associated with trunk circuit TRK101 from starting the transmission of tone signals representing the office code and numerical digits of the called subscriber's directory number to the trunk circuit 230 in office B. With the sender 118 ready to transmit the tone signals, ground is connected through a high resistance in the sender, through trunk circuit 110 and contacts of switches 111, 112, 115 and 116, and through conductors OT and OR in parallel, back contacts of relay SP, conductors 357 and 358, the windings of retard coil 355, back contacts of relay IR, a front contact of relay OS1, continuity back contact and winding of relay SL to battery. Being marginal, relay SL does not operate; but a relay in the sender operates, thereby effecting a reduction in the resistance included in this circuit to cause the operation of relay SL. Relay SL, operated, disconnects its winding from, and connects signaling conductor E through resistor F to, the above-traced connection to ground in the sender 118; and at the same time relay SL locks in parallel with relay OS1 under the control of relay G. The operation of relay SL also reconnects the talking conductors 173 and 174, through condensers 373 and 374 and conductors 377 and 378 to conductors OT1 and OR1, thence to incoming trunk circuit 110; so that the outgoing talking path between trunk circuit 110 and conductors 173 and 174 is complete and tone signals from sender 118 may be transmitted thereover to the trunk circuit 230 in office B. When a sender 218 is attached to trunk circuit 230 and this sender is ready to receive the tone signals, a "start" signal is transmitted from the trunk circuit 230 which causes the release of relay CX13, whereby ground is disconnected from signaling conductor E thus indicating to the sender 118 that the tone signals should now be transmitted. When the tone signal transmission is completed, the sender 118 is disconnected. Upon completion of the connection through office B to the called subscriber line and answer of the call, the trunk circuit 230 in office B transmits an "off-hook" answering supervisory signal causing the operation of relay CX13; and ground is thereby connected to conductor E, thence through the above-traced connection including conductors 357 and 358 to the incoming trunk circuit 110. When the called subscriber replaces the receiver on the switchhook, trunk circuit 230 transmits an "on-hook" signal causing release of relay CX13 and disconnection of ground from conductor E.

When the originating toll operator or calling subscriber disconnects at the end of conversation, the incoming trunk circuit 110 disconnects ground from conductor OS causing the release of relay OS and the opening of the connections between trunk circuit 110 and trunk circuit TRK101. The release of relay OS reconnects ground to conductor OS and to conductor MS as a busy indication; opens the operating circuit of relay G; disconnects battery from, and connects ground to, conductor M to effect the transmission of a disconnect signal to trunk circuit 230 in office B; and opens the short-circuiting connection across condenser TMC, whereupon this condenser is charged through timing resistors TMX and TMY in series. When the potential difference across the control gap of tube TM resulting from charging condenser TMC, causes breakdown of the tube, the energization of the right winding of relay G by the current in the main gap causes release of relay G followed by release of relays OS1 and SL. The release of relay G opens its locking circuit, and de-energizes tube TM. The release of relays OS1 and SL restores trunk circuit TRK101 to normal including the disconnection of ground from conductors MS and OS whereby the trunk circuit may now be seized for use as an outgoing trunk circuit on another call.

The direction reversing control circuit 140 of office A is shown in detail in Figs. 5 to 9, inclusive; and the like circuit 240 of office B is shown in Figs. 10 to 14, inclusive. The circuit unit 140 is common to the group of twenty reversible trunk circuits 130 in office A; and the control circuit 240 is common to the associated group of reversible trunk circuits 230 in office B.

Figure 5:
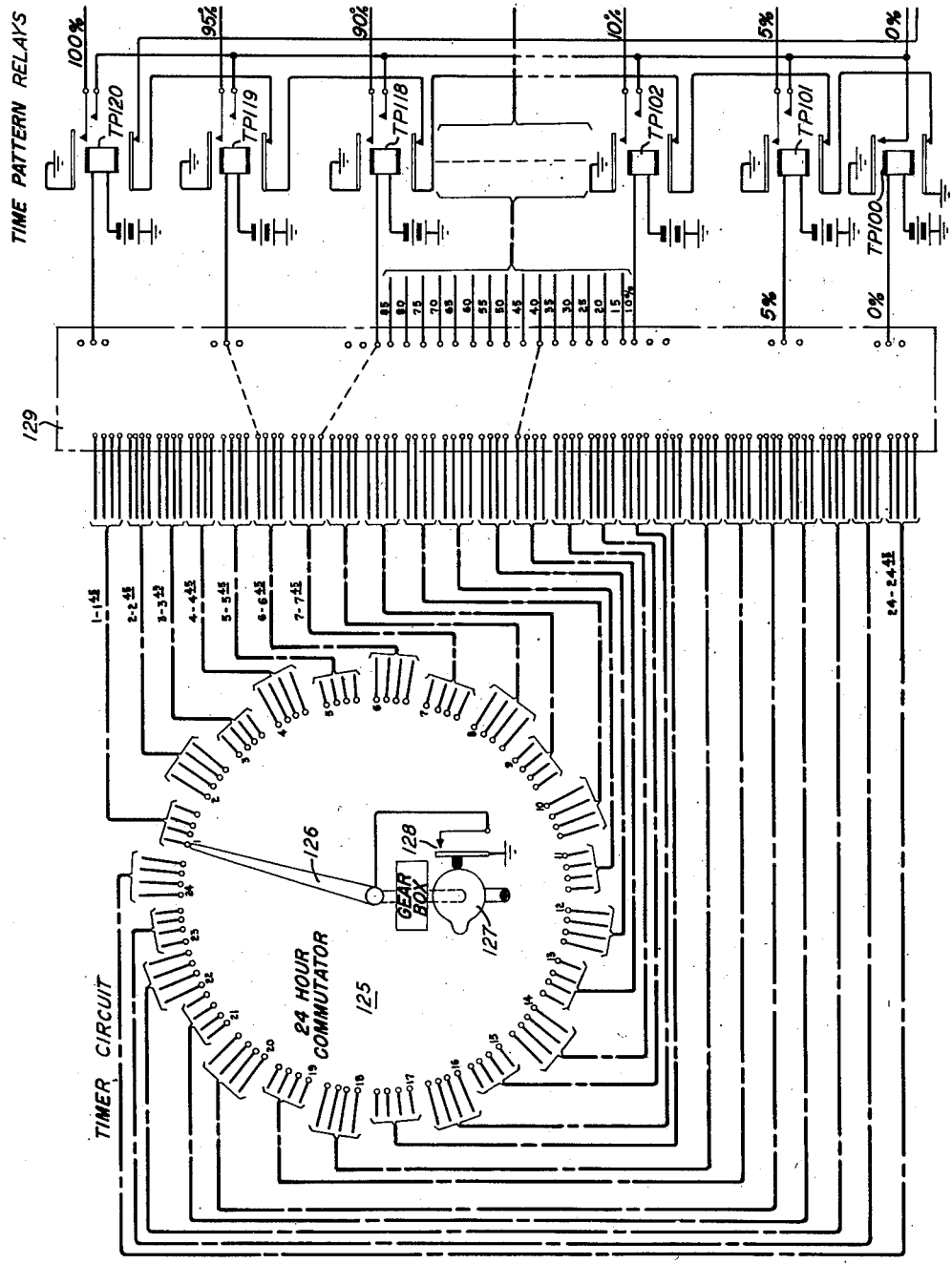

The trunk reversing control equipment in office A includes a timer circuit, shown in Fig. 5, having a synchronous motor-driven switch 125 which may be common to all of the groups of reversible trunks in the office. The switch has a contact segment for each 15-minute period of the day, each segment being engaged by wiper 126 for two minutes out of the 15-minute period. A cam 127 on the motor shaft closes a contact 128 for two seconds in every 2-minute period. Cross-connecting terminal means 129 facilitates connection of the switch segments engaged by wiper 126 to effect the operation of any desired one of a group of time pattern relays TP100 to TP120, inclusive, shown in Fig. 5, there being a group of these relays for each group of reversible trunks in office A. The single group of time pattern relays, shown in Fig. 5, is associated with the reversible trunks between offices A and B. Each one of these relays corresponds to the percentage of these trunks required to carry the outgoing traffic to office B during the intervals corresponding to the timer switch segments to which the relay is operatively connected, there being one relay for each percentage from 0 percent to 100 percent in 5 percent increments. The operation of any of time pattern relays TP101 to TP120 closes a circuit for operating the corresponding one of a group of twenty trunk percentage relays T101 to T120, shown in Fig. 6. The operation of any one of time pattern relays TP100 to TP120 connects ground to the associated percentage conductor to short-circuit the holding winding of any operated, higher numbered trunk percentage relay and thus cause its release. The operation of any one of the time pattern relays also opens a chain connection, thereby disabling the trunk reversing control for each 2-second period during which a time pattern relay is operated. The operation of any one of the trunk percentage relays causes the successive operation of each lower numbered relay, if not already operated.

The trunk percentage relays together with the S relay in each of the twenty trunks TRK101 to TRK120 partially shown in Fig. 6, control the balance of a resistance bridge across which the windings of polarized relays TA10 and TR10 are connected. One arm of the bridge includes resistors R101 to R120, inclusive, each of which may be short-circuited by back contacts of the associated one of relays T101 to T120, inclusive; and another arm of the bridge includes resistors A1 to A20, inclusive, each of which may be short-circuited by front contacts of the S relay in the associated one of trunk circuits TRK101 to TRK120. When the number of trunks available, as indicated by the non-operated condition of relay S in each, equals the number of trunks required as indicated by the operated condition of the trunk percentage relays T101 to T120, the bridge is balanced and neither relay TA10 nor TR10 operates. When the number of trunks required for carrying the outgoing traffic from office A to office B is larger than the number of trunks available, the trunks-required relay TR10 operates; and, when the number of trunks available is larger than the number of trunks required, the trunks-available relay TA10 operates. Relays TA11, TA12, TR11 and TR12, shown in Fig. 7, control the transmission of trunks-available and trunks-required signals over the signaling channel comprising the lower conductor of trunk 50; and relays TRG11 and TRG12 initiate the reversing operation when all trunks in the group available for use as outgoing trunks are busy.

The commutator relays CM101 to CM120 in office A sequentially and cyclically connect the winding of the S relay in each of the reversible trunk circuits for operation or release whenever the direction of any of the trunk circuits is to be reversed, as indicated by an unbalanced condition of the resistance bridges comprising resistors R101 to R120 and A101 to A120. And to synchronize the operation of the commutator relays CM101 to CM120 in office A with the operation of the commutator relays CM201 to CM220 in office B, synchronizing signals are transmitted over the signaling channel comprising relays CX11 and CX21 and the upper conductor of trunk 50. The commutator relays are operated in a chain, each relay operating under the control of the preceding relay and locking under control of the succeeding relay in the chain as hereinafter further described.

Whenever relay TA10 is operated, because there are more trunks available for use as outgoing trunk circuits in office A than the operated condition of the trunk percentage relays indicates are required, it closes a circuit for operating relay TA11, thereby connecting battery through conductor 165, retard coil 166, upper winding of relay CX12, lower winding of retard coil 151, lower conductor of trunk 50, lower winding of retard coil 251, middle and upper windings of relay CX22 to ground, causing the operation of relay CX22 in office B; and whenever relay TA20 is operated due to a similar condition in office B, a trunks available signal is transmitted over the lower conductor of trunk 50 operating relay CX12. Whenever relay TR10 is operated, because there are fewer trunk circuits available in office A for use as outgoing trunk circuits than the percentage relays indicate should be available for such use, relay TR10 closes a circuit for operating relay TR11. The operation of relay TR11 closes a circuit for operating relay TR12 provided relay CX12 is at that time operated responsive to a trunks-available signal incoming from office B; and transmits a trunks-required signal by connecting ground to conductor 165 so that relay CX22 in office B is non-operated. Whenever relay TR20 is operated, because there are fewer trunk circuits available in office B for use as outgoing trunk circuits than the percentage relays indicate should be available for such use, relay TR21 is operated; and, with relay CX22 then operated responsive to a trunks-available signal incoming from office A, relay TR22 is operated. The operation of relay TR21 transmits a trunks-required signal to office A whereby relay CX12 in office A is non-operated. If the resistance bridges in both offices are balanced, none of the trunks-available and trunks-required relays are operated. At such a time, some one of the commutator relays in each office is locked operated under control of the next higher numbered comutator relay; and relays ST11, ST12, SLO1, and CMC1 in office A and the corresponding relays in office B are not operated. Relays X1 and Y1 in office A are controlled by relay CX11 and relays X2 and Y2 in office B are controlled by relay CX12 to connect the windings of relays CMC1 and CMC2 to the windings of the commutator relays in succsession whenever trunk circuits are to be reversed as to the direction of calls therethrough.

Assume now that the resistance bridges become unbalanced, more trunks being required for use as outgoing trunks in office A, relays TR10, TR11 and TR12 being operated as above described to establish the trunks-required signal condition, whereby relay CX12 remains non-operated. The operation of relay TR12 closes a circuit for operating start relay ST11 of the synchronizing circuit shown in Fig. 9; prevents closure of the operating circuit of relay TA12; and prevents closure of the circuit for operating trigger relays TRG11 and TRG12. The operation of start relay ST11 closes a locking circuit through its upper winding, closes a circuit for operating relay ST12 and closes a circuit for operating relay SLO1. The operation of relay ST12 disconnects ground from, and connects battery to, conductor 155, thence through retard coil 156, upper winding of relay CX11, upper winding of retard coil 151, to the upper conductor of trunk 50 to operate relay CX21 in office B. The operation of relay SLO1 closes a locking circuit through its upper winding and opens the operating circuit of relay ST11. Assuming further that relays X2 and Y2 are non-operated at the time relay CX21 operates, the operation of relay CX21 closes a circuit for operating relay X2 of the synchronizing circuit in office B. The operation of relay X2 closes a circuit including the winding of relay CMC2, front contact of relay X2, back contact of relay Y2, front contact of the operated one of the commutator relays, for instance relay CM218, and the winding of the adjacent succeeding commutator relay, for instance relay CM219, whereby relay CMC2 and the commutator relay are operated. The commutator relay thus operated, for instance relay CM219, locks to the next succeeding relay and causes the release of the adjacent preceding relay; and the release of this preceding commutator relay causes release of relay CMC2. The aforementioned operation of relay CMC2 disconnects ground from, and connects battery through, conductor 255, retard coil 256, upper winding of relay CX21, upper winding of retard coil 251, to the upper conductor of trunk 50 to operate relay CX11 in office A; and the aforementioned release of relay CMC2 disconnects battery from and reconnects ground to the upper conductor of trunk 50 to cause the release of relay CX11 in office A.

Assuming relays X1 and Y1 to be non-operated at the time that an operation of relay CMC2 in office B causes the operation of relay CX11 in office A, the operation of relay CX11 causes the operation of relay X1. The operation of relay X1 closes a circuit including the winding of relay CMC1, front contact of relay X1, back contact of relay Y1, front contact of the operated one of the commutator relays, for instance relay CM118 and the winding of the adjacent succeeding commutator relay, for instance relay CM119. Relay CMC1 and the commutator relay are thereby operated. The commutator relay thus operated, for instance CM119, locks to the adjacent succeeding relay and causes the release of the adjacent preceding relay; and the release of this preceding relay causes the release of relay CMC1. The aforementioned operation of relay CMC1 causes the release of relays ST11, ST12 and SLO1, the commutator relays in each office having been advanced one step. When relay ST12 releases, ground is reconnected to conductor 155 causing release of relay CX21 in office B.

The release of relay CX21 after operation of relay X2, closes a circuit for operating relay Y2, relay X2 being held operated by its upper winding; and the release of relay CX11, after operation of relay X1, closes a circuit for operating relay Y1, relay X1 being held operated by its upper winding. Assuming that relays TR10 and TR11 remain operated, the release of relay SLO1 causes the reoperation of relay ST11. Relays ST12 and SLO1 are thereby reoperated. The reoperation of relay ST12 again disconnects ground from, and connects battery to, conductor 155 to reoperate relay CX21 in office B. The reoperation of relay CX21 connects ground to conductor 258, thence through a front contact of relay Y2 to short-circuit the upper winding of relay X2, causing the release of relay X2. With relay Y2 operated, the release of relay X2 closes a circuit for operating the next commutator relay in office B and relay CMC2 in series. The reoperation of relay CMC2 disconnects ground from, and connects battery to, conductor 255 thereby causing the reoperation of relay CX11 in office A. The reoperation of relay CX11 connects ground to conductor 158, thence through a front contact of relay Y1 to short-circuit and thereby cause the release of relay X1. With relay Y1 operated, the release of relay X1 closes a circuit for operating the next commutator relay in office A and relay CMC1 in series. The newly operated commutator relay in each office locks under control of the adjacent succeeding relay and causes release of the preceding relay and release of the associated relay CMC2 or relay CMC1. The release of relay CMC2 again causes the release of relay CX11, and the release of relay CMC1 again causes the release of relay CX21, in the manner hereinbefore described. The release of relay CX21, after both of relays X2 and Y2 have been operated, short-circuits the locking winding of relay Y2 to release relay Y2, thereby completing another step in the cyclic operation of the commutator relays in office B; and the release of relay CX11, after both of relays X1 and Y1 have been operated, short-circuits the locking winding of relay Y1 to release relay Y1, thereby completing another step in the cyclic operation of the commutator relays in office A.

With the trunks-available condition existing in office B and a trunks-required condition existing in office A, the operation of any commutator relay in office B closes a connection from ground through back contacts of the time pattern relays, front contact of relay TA22, front contact of the commutator relay, to conductor OP of the associated trunk circuit so as to effect operation of the S relay if this relay is not operated and if the trunk circuit is idle as indicated by the non-operated condition of relays LC and OS. As hereinbefore described, operation of the S relay of a trunk circuit renders it unavailable for use as an outgoing trunk circuit. At the same time the operation of the corresponding commutator relay in office A closes a connection from ground through back contacts of the time pattern relays, front contact of relay TR22, front contact of the commutator relay, to conductor REL of the associated trunk circuit so as to effect the short-circuiting of the S relay in this trunk circuit and cause release of this relay, thereby to render the trunk circuit available for use as an outgoing trunk circuit. As soon as the required number of trunk circuits are available in each office for use as outgoing trunk circuits, the resistance bridges in the two offices are balanced and the trunks available and trunks required relays which were operated release; and further operation of the commutator relays does not occur until the trunk percentage bridges again become unbalanced.

The trunk reversng operations which occur when additional trunk circuits are required in office B for use as outgoing trunk circuits are similar to the above-described operation occurring when additional trunk circuits are required for use as outgoing trunk circuits in office A.

If at any time, an incoming trunk circuit such as trunk circuit 110 or 210 is seized and at that time all the trunk circuits available in that office for use as outgoing trunk circuits are found busy when the marker tests the group, the TSD1 or TSD2 relay is operated. Assume relay TSD1 to be operated due to such a condition in office A, thereby closing a circuit for operating relay TR11. The operation of relay TR11 connects ground to conductor 165, hence through retard coil 166, upper winding of relay CX12, lower winding of retard coil 151, lower conductor of trunk 50, lower winding of retard coil 251 in office B and the upper and middle windings of relay CX22 to ground. Relay CX22 thereupon closes a circuit for operatively energizing the lower winding of relay TRG21 in office B, which circuit includes a back contact of relay TRG22 and the contacts of interrupter INT2, back contacts of relays TR21 and TA21 to ground at the back contact of relay CX22. The interrupter contacts are cyclically closed and opened once each second, the closed period being for .5 second. The operation of relay TRG21 closes a circuit including the interrupter contacts for operating relay TRG22. Relay TRG22 locks under control of the interrupter and relay CX22, opens the operating circuit of relay TRG21, and extends the ground connection including the interrupter contacts through the upper winding and upper front contact of relay TRG21 to shunt the winding of the highest numbered trunk percentage relay which is operated. When this trunk percentage relay releases, relay TRG21 releases but relay TRG22 remains locked until the interrupter contacts are opened, the trunks-required signal from office A is terminated, or relay TA21 or TR21 operates. The release of one of the trunk percentage relays unbalances the resistance bridge in office B to operate relays TA20 and TA21, whereupon the commutator relays in the two offices are operated in the manner above set forth to reverse the direction of trunks until the resistance bridges are again balanced. If at any time, both the TSD1 and TSD2 relays are operated, both of relays TR11 and TR21 are operated and the trunks-required signal is transmitted from each office to the other, in which case no further reversal of trunks occurs until the TSD1 relay or the TSD2 relay releases to terminate the trunks required signal from one of the offices.

What is claimed is:

1. In a communication system comprising a group of interoffice trunks, each trunk adapted for use on a call in either direction, a trunk circuit at each end of said trunk arranged for use either as an incoming trunk circuit or as an outgoing trunk circuit, relay means in each trunk circuit for marking the trunk circuit unavailable for use as an outgoing trunk circuit, means in each office determining at intervals the number of trunk circuits in the office to be marked unavailable for use as outgoing trunk circuits, and means in each office for selectively operating or releasing said relay means of one or more trunk circuits in succession to effect the marking of a different number of trunk circuits as unavailable for use as outgoing trunk circuits.

2. In a communication system comprising a group of interoffice trunks, each trunk adapted for use on a call in either direction and having a trunk circuit at each end thereof arranged for use on a call in either direction, circuit means in each trunk circuit operable to mark the trunk circuit unavailable for use as an outgoing trunk circuit, other means in each trunk circuit for marking said trunk circuit busy when in use as an outgoing trunk circuit, timer means in each office, register means in each office variably settable under control of said timer means to register the number of trunk circuits to be marked in each office as unavailable for use as outgoing trunk circuits, control means in each office for selectively operating or releasing said circuit means of said trunk circuits, and means in each office jointly controlled by said register means and said circuit means of each trunk circuit for selectively connecting said control means to each trunk circuit one at a time in succession.

3. In a communication system comprising two offices and a group of two-way trunks therebetween, a trunk circuit in each office for each of said trunks, each trunk circuit having circuit means therein operable to mark said trunk circuit as unavailable for use as an outgoing trunk circuit, timer means in each office, register means in each office variably settable under control of the timer means to indicate the number of trunk circuits to be marked as unavailable for use as outgoing trunk circuits, control means in each office for selectively operating said circuit means of said trunk circuits, and commutator means in each office rendered effective by the marking of a number of trunk circuits as unavaliable for use as outgoing trunk circuits different from the number indicated by the setting of the register means for connecting said control means to each trunk circuit in succession.

4. In a communication system comprising two offices and a group of two-way trunks therebetween, a trunk circuit in each office for each of said trunks, each trunk circuit having circuit means therein operable to mark said trunk circuit as unavailable for use as an outgoing trunk circuit, timer means in each office, register means in each office variably settable under control of the timer means to indicate the number of trunk circuits to be marked as unavailable for use as outgoing trunk circuits, control means in each office for selectively operating said circuit means of said trunk circuits, commutator means in each office rendered effective by the marking of a number of trunk circuits as unavailable for use as outgoing trunk circuits different from the number indicated by the setting of the register means for connecting said control means to each trunk circuit in succession, and means including signaling means between said offices for synchronizing the connection of the control means to the trunk circuits in one office with the connection of the control means to each corresponding trunk circuit in the other office.

5. In a communication system comprising two offices and a group of two-way trunks therebetween, a trunk circuit in each office for each of said trunks, each trunk circuit having circuit means therein operable to mark said trunk circuit as unavailable for use as an outgoing trunk circuit, timer means in each office, register means in each office variably settable under control of the timer means to indicate the number of trunk circuits to be marked as unavailable for use as outgoing trunk circuits, control means in each office for selectively operating said circuit means of said trunk circuits, commutator means in each office rendered effective by the marking of a number of trunk circuits as unavailable for use as outgoing trunk circuits different from the number indicated by the setting of the register means for connecting said control means to each trunk circuit in succession, and means effective when all trunk circuits available for use as outgoing trunk circuits in one office are busy for changing the setting of the register means thereby to start the operation of said commutator means and thereby render available in said office a larger number of trunk circuits for use as outgoing trunk circuits than were previously available.

6. In a communication system comprising two offices and a group of two-way trunks therebetween, a trunk circuit in each office for each of said trunks, each trunk circuit having circuit means therein operable to mark said trunk circuit as unavailable for use as an outgoing trunk circuit, timer means in each office, register means in each office variably settable under control of the timer means to indicate the number of trunk circuits to be marked as unavailable for use as outgoing trunk circuits, control means in each office for selectively operating said circuit means of said trunk circuits, commutator means in each office rendered effective by the marking of a number of trunk circuits as unavailable for use as outgoing trunk circuits different from the number indicated by the setting of the register means for connecting said control means to each trunk circuit in succession, means including a signaling channel over one of said trunks between said offices for synchronizing the connection of the control means to the trunk circuits in one office with the connection of the control means to each corresponding trunk circuit in the other office, and means effective when all trunk circuits available for use as outgoing trunk circuits in one office are busy for changing the setting of the register means thereby to start the operation of said commutator means and thereby render available in said office a larger number of trunk circuits for use as outgoing trunk circuits than were previously available.

7. In a communication system comprising a group of interoffice trunks, each trunk adapted for use on a call in either direction and having a trunk circuit at each end thereof arranged for use on a call in either direction, circuit means in each trunk circuit operable to mark the trunk circuit unavailable for use as an outgoing trunk circuit, other means in each trunk circuit for marking said trunk circuit busy when in use as an outgoing trunk circuit, timer means in each office, register means in each office variably settable under control of said timer means to register the number of trunk circuits to be marked in each office as unavailable for use as outgoing trunk circuits, control means in each office for selectively operating or releasing said circuit means of said trunk circuits, means in each office jointly controlled by said register means and said circuit means of each trunk circuit for selectively connecting said control means to each trunk circuit one at a time in succession, and means for disabling said control means while the setting of said register means is being changed.

8. In a communication system comprising a group of interoffice trunks, each trunk adapted for use on a call in either direction and having a trunk circuit at each end thereof arranged for use on a call in either direction, circuit means in each trunk circuit operable to mark the trunk circuit unavailable for use as an outgoing trunk circuit, other means in each trunk circuit for marking said trunk circuit busy when in use as an outgoing trunk circuit, timer means in each office, register means in each office variably settable under control of said timer means to register the number of trunk circuits to be marked in each office as unavailable for use as outgoing trunk circuits, control means in each office for selectively operating or releasing said circuit means of said trunk circuits, means in each office jointly controlled by said register means and said circuit means of each trunk circuit for selectively connecting said control means to each trunk circuit one at a time in succession, and means for disabling said control means whenever all of said trunks are busy.

9. In a communication system comprising two offices and a group of two-way trunks therebetween, a trunk circuit in each office for each of said trunks, each trunk circuit having circuit means therein operable to mark said trunk circuit as unavailable for use as an outgoing trunk circuit, timer means in each office, register means in each office variably settable under control of the timer means to indicate the number of trunk circuits to be marked as unavailable for use as outgoing trunk circuits, control means in each office for selectively operating said circuit means of said trunk circuits, relay means in each office operative responsive to the setting of the associated register to indicate a number of trunk circuits different from the number then marked as unavailable for use as outgoing trunk circuits, and commutator means rendered effective by operation of said relay means for connecting said control means to said trunk circuits one at a time to change the marking of said trunk circuits in accordance with the register setting.

References Cited in the file of this patent

UNITED STATES PATENTS

| | | |
|---|---|---|
| 2,385,061 | Clark | Sept. 18, 1945 |
| 2,678,969 | Lomax | May 18, 1954 |